United States Patent
Gayrard et al.

(10) Patent No.: US 7,158,726 B2
(45) Date of Patent: Jan. 2, 2007

(54) BACKBONE INTERFACE, A TERMINAL INTERFACE FOR COMMUNICATIONS IN A SPACE VEHICLE, AND A COMMUNICATIONS NETWORK COMPRISING SUCH INTERFACES

(75) Inventors: Jean-Didier Gayrard, Toulouse (FR); Michel Sotom, Toulouse (FR); Michel Maignan, Pins Justaret (FR)

(73) Assignee: Alcatel, Paris (FR)

( * ) Notice: Subject to any disclaimer, the term of this patent is extended or adjusted under 35 U.S.C. 154(b) by 658 days.

(21) Appl. No.: 10/303,873

(22) Filed: Nov. 26, 2002

(65) Prior Publication Data
US 2003/0123879 A1    Jul. 3, 2003

(30) Foreign Application Priority Data
Nov. 27, 2001    (FR) ................... 01 15302

(51) Int. Cl.
   *H04B 10/00*  (2006.01)
(52) U.S. Cl. .............. 398/121; 398/122; 398/124; 398/116; 398/140; 398/141; 398/165; 398/153; 398/79; 398/163; 398/171; 244/158 R; 340/10.3; 340/70; 370/277; 370/316
(58) Field of Classification Search ............. 398/79, 398/91, 82, 171, 140, 141, 163, 124, 121, 398/116, 153, 165, 122; 244/158 R; 340/10.3, 340/70, 277, 316
See application file for complete search history.

(56) References Cited

U.S. PATENT DOCUMENTS

| | | | | |
|---|---|---|---|---|
| 6,160,649 A * | 12/2000 | Horiuchi et al. | ............... | 398/34 |
| 6,252,691 B1 * | 6/2001 | Porzucki et al. | ............ | 398/121 |
| 6,345,137 B1 * | 2/2002 | Imajo | .......................... | 385/46 |
| 6,522,803 B1 * | 2/2003 | Nakajima et al. | ............. | 385/24 |
| 6,563,613 B1 * | 5/2003 | Tochio | ........................ | 398/25 |
| 6,714,702 B1 * | 3/2004 | Whiteaway et al. | .......... | 385/24 |
| 6,792,212 B1 * | 9/2004 | Lloyd et al. | ................ | 398/124 |

FOREIGN PATENT DOCUMENTS

EP    0 954 128 A2    11/1999

OTHER PUBLICATIONS

Jian-Gou Zhang: "High-capacity avionics optical fiber information exchange networks" Aerospace and Electronics Conference, 1993. Naecon 1993., Proceedings of the IEEE 1993 national Dayton, OH, USA May 24-28, 1993, New York, NY, USA, IEEE, U.S., pp. 204-210, XP010115947.

McMahon D H: "Doing Wavelength-Division Multiplexing with Today's Technology" IEEE LTS. The Magazine of Lightwave Communication Systems, IEEE Inc. New York, US, vol. 3, No. 1, Feb. 1, 1992, pp. 40-44, 47-50, XP000248644.

* cited by examiner

*Primary Examiner*—Hanh Phan
(74) *Attorney, Agent, or Firm*—Sughrue Mion, PLLC

(57) ABSTRACT

The invention relates to a communications backbone interface between at least three members of a communications network for a space vehicle. In the invention, the interface combines various signals received at inlets, which signals may be analog, digital, and optical, coming from two members, and produces a multiplexed optical signal for delivery to a member of the vehicle, such as a piece of equipment. The invention also provides to a communications terminal interface, a communications network having such interfaces, and an optical fiber harness.

10 Claims, 4 Drawing Sheets

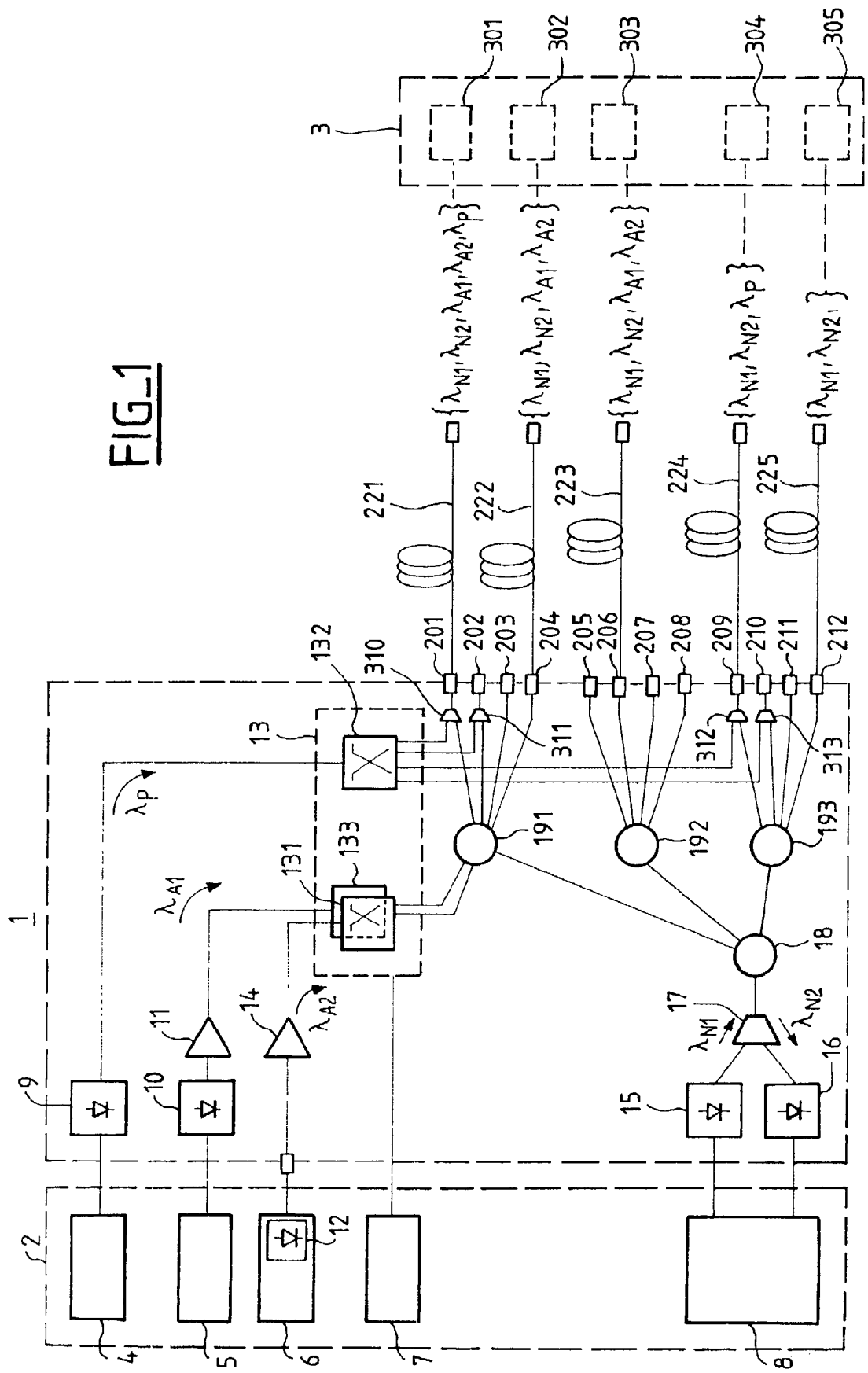
FIG_1

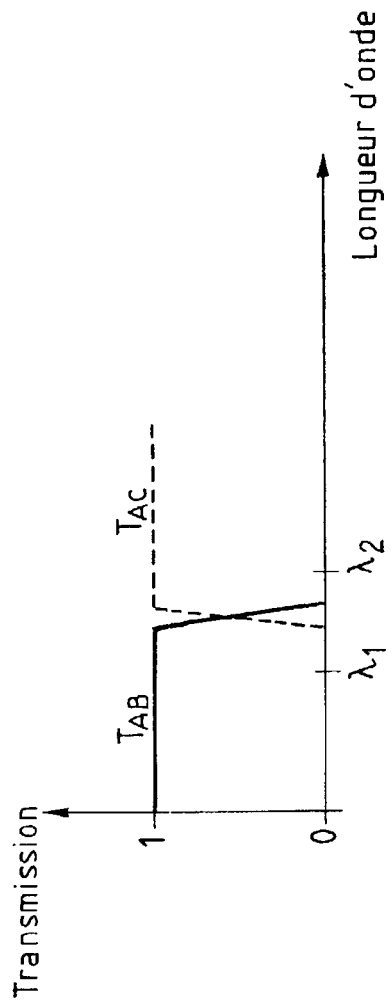
FIG_2b
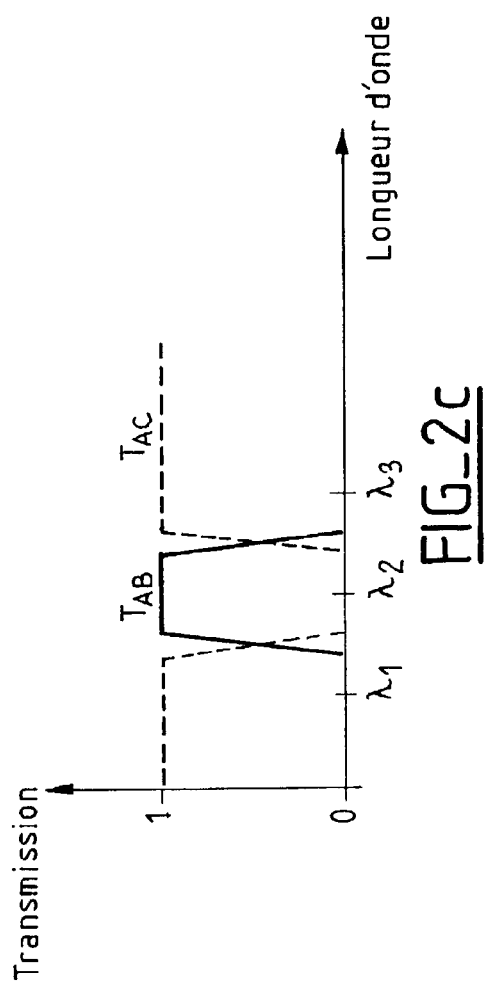
FIG_2c
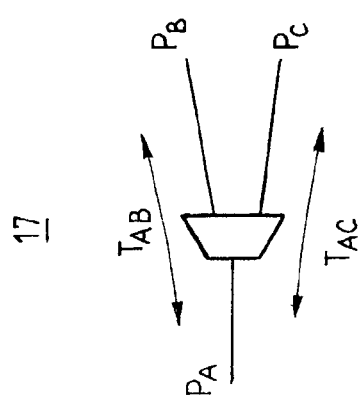
FIG_2a

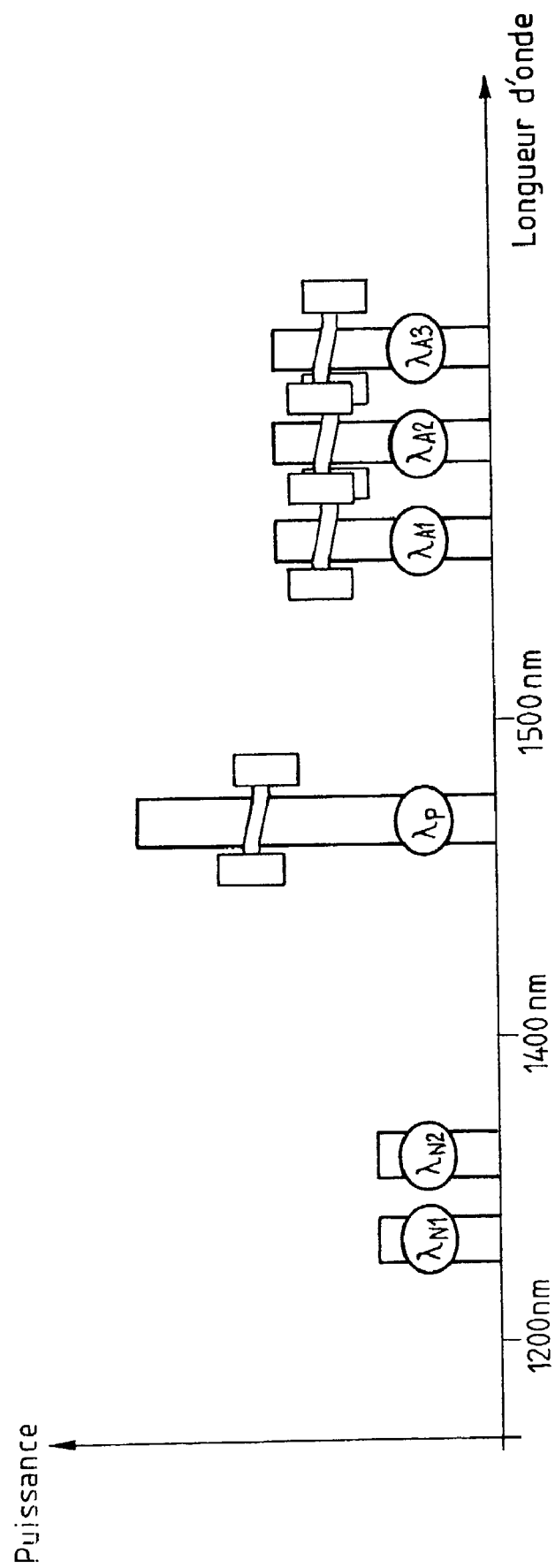
FIG_3

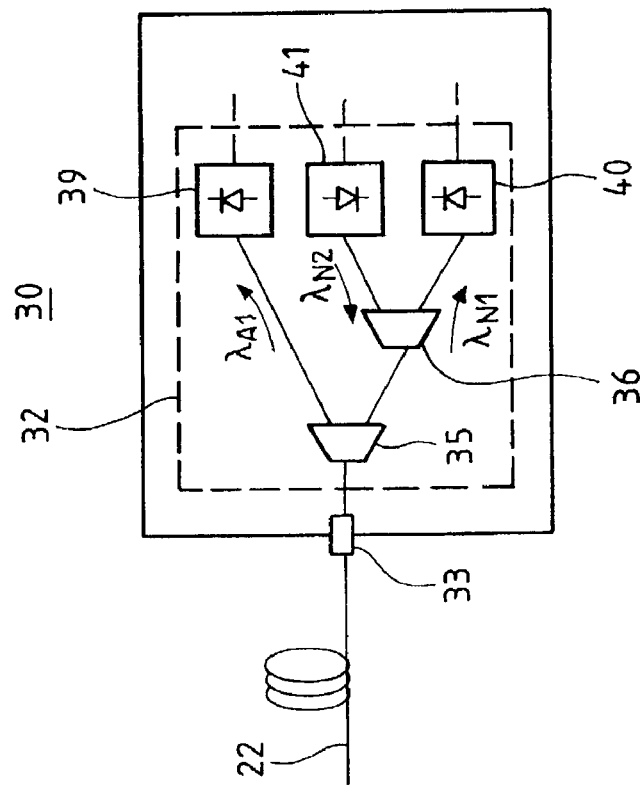
FIG_4b
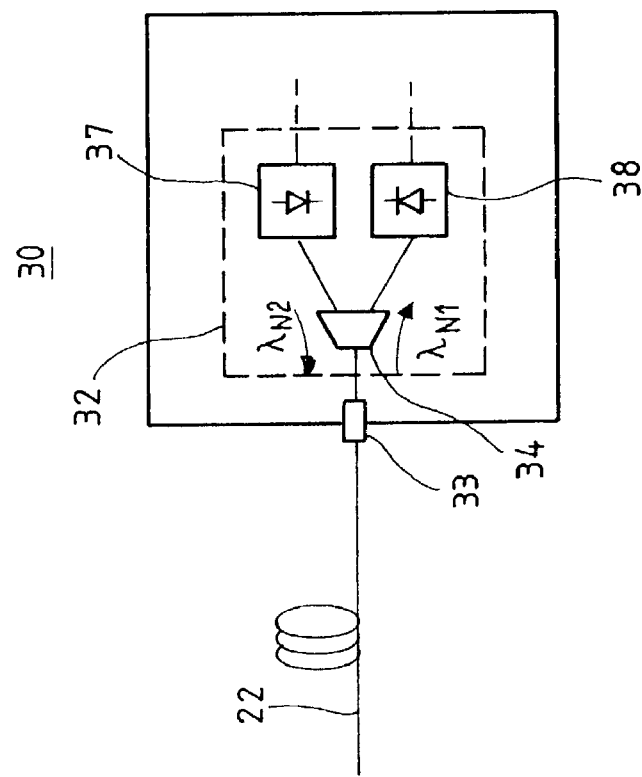
FIG_4a

BACKBONE INTERFACE, A TERMINAL INTERFACE FOR COMMUNICATIONS IN A SPACE VEHICLE, AND A COMMUNICATIONS NETWORK COMPRISING SUCH INTERFACES

The present invention relates to the field of communications interfaces for space vehicles.

More particularly, the invention relates to a backbone interface for communication between at least three members of a communications network for a space vehicle.

The invention also relates to a terminal interface for communication by any one of said members.

The invention also relates to a network for communications between at least three members in a space vehicle.

BACKGROUND OF THE INVENTION

On board a space vehicle such as a satellite there are numerous pieces of electronic equipment such as amplifiers, receivers, filters, etc. These pieces of equipment are often provided redundantly for reasons of reliability, and they may belong, for example, to a system for relaying television or telephone signals by satellite, or to systems for performing service functions on board a satellite (on-board management, attitude control, power supply, etc.).

When a satellite is launched, a nominal operating configuration is selected, i.e. various pieces of equipment are selected to perform service functions, some channels are selected to carry telephone signals, and some channels to carry television signals. During the lifetime of the satellite, and in particular for commercial reasons, it may be that its configuration needs to be modified. In order to reconfigure equipment to satisfy requirements, control and monitoring stations on the ground send remote control signals (RC) over a radio link to a receiver on board the satellite, and the signals are applied to a digital central control unit (CU) constituted by a unit referred to as control terminal unit (CTU) for processing these signals together with a plurality of remote terminal units (RTUs) for applying these signals to the various pieces of equipment. The RC signals may also serve to select amongst redundant equipment which pieces will actually be active, in particular amongst systems that perform service functions on board the satellite. The RC signals thus serve to control and manage the operation of all of the on-board electronic equipment.

It is always desirable to perform tests for inspection purposes, either to verify that the RC signals have been properly executed, or to detect from the ground that possible breakdowns have occurred that run the risk of harming proper operation of the satellite or of disturbing the signals it relays. Various pieces of equipment therefore send telemetry signals (TM) to the central unit, which signals are forwarded to the ground by appropriate transmitters on board the satellite and in communication with the central unit. The TM signals may be transmitted either in response to RC signals, or they may be transmitted systematically so as to enable the state of on-board equipment to be monitored continuously.

The TM and RC signals are transmitted between the central unit and the various pieces of equipment in conventional manner by using wire links made up into cables; considered as a whole, these wire links for transmitting remote control and telemetry signals is referred to as the "TM-RC harness".

In addition to requiring these remote control and telemetry and acquisition signals RC and TM to be transmitted, the payload equipment and the platform equipment of satellites also require frequency or time reference (clock) signals, electrical power supply, etc.

Each type of signal is conveyed by a dedicated and specialized network based on wire links. Like the TM-RC harness for TM-RC service signals, each network requires a specific harness to be designed, made, and installed.

However, these harnesses are expensive, heavy, and different for each satellite. The time they require for integration is long: this includes verifying each harness wire by wire, verifying each connector contact by connector, monitoring each signal whenever a piece of equipment is mounted, and verifying electromagnetic compatibility.

Known solutions for reducing the mass of a harness and the number of links it involves exist in the following forms:

- for remote control and telemetry signals RC and TM, one known solution consists in using digital buses for conveying the various digitized signals going to or from the various pieces of equipment, said signals being time division multiplex. However, that solution remains limited and, for example, it does not cope with the need for frequency references (local radio frequency (RF) oscillators) or time references (clocks or synchronization pulses), for example;
- the frequency references or local oscillators (LOs) and ultra-stable oscillators (USOs) are grouped together within specialized coaxial cable networks. In addition to their significant mass, those networks electrically interconnect pieces of microwave equipment that are highly sensitive, and that leads to severe problems of electromagnetic compatibility between pieces of equipment.

OBJECT AND SUMMARY OF THE INVENTION

The object of the present invention is thus to obtain a backbone communications interface between at least three members within a single communications network for a space vehicle, and that is capable of mitigating the above-mentioned problems.

To this end, the invention provides a backbone communications interface between at least three members of a communications network for a space vehicle, the members comprising a first group of at least two members, and a second group of members, the interface comprising:

- first electro-optical converter means for converting electrical signals received as inputs to the interface into optical signals carried by specific wavelengths and/or for inverse conversion of a demultiplexed optical signal into electrical signals for the first group; and
- first multiplexing/demultiplexing means for forming a wavelength divided multiplexed optical signal out of the converted and/or received optical signals, and/or for demultiplexing a multiplexed optical signal forming a plurality of demultiplexed optical signals;
- said first multiplexing/demultiplexing means being suitable for being connected via an inlet/outlet of the interface to an optical connection of said network, which connection is for conveying the wavelength division multiplex signal to and/or from at least one member of the second group.

In an embodiment, the first group comprises:

- control means suitable for delivering a remote control signal for controlling a remote piece of equipment forming a member of the second group and/or for receiving a telemetry signal from said equipment;

frequency and/or phase and/or time reference means suitable for delivering at least one frequency and/or phase and/or time reference signal; and means for delivering a power signal.

In an embodiment, the interface includes means for selecting received electrical and/or optical signals for taking into account when making up the multiplexed signals.

In an embodiment, the selection means comprise switch means suitable for being controlled by control means.

In an embodiment, the interface has a plurality of outlets each suitable for being connected to an optical connection, and each serving to convey a respective selection of wavelengths from the wavelengths corresponding to the signals received and/or transmitted by the backbone interface.

The invention also provides a communications terminal interface for a member of the second group as defined above, the interface comprising:

second multiplexing/demultiplexing means suitable for selecting one wavelength from the plurality of wavelengths forming the wavelength division multiplex signal received at an inlet of the terminal interface;

second electro-optical converter means for converting said optical signal carried by said selected wavelength into an electrical signal supplied to said member of the second group and/or for performing the inverse conversion of an electrical signal provided by said member and carried by a determined wavelength.

In an embodiment, the second multiplexing/demultiplexing means comprise first sub-filter means for selecting a plurality of wavelengths from said plurality of wavelengths, and second sub-filter means for selecting one wavelength from said selected plurality of wavelengths.

In an embodiment, the second multiplexing/demultiplexing means comprise a cascade of sub-filter means, with the number of means in the cascade being a function of the number of wavelengths used by said member of the second group.

In an embodiment, said electrical signal supplied to said member of the second group is a remote control signal and/or said electrical signal supplied by said member is a telemetry signal.

The invention also provides a communications network between at least three members for a space vehicle, the network including a communications backbone interface of the invention and/or a communications terminal interface of the invention.

The invention also provides a harness for a communications network between at least three members of a space vehicle, the harness comprising at least one optical connection of the optical fiber type for conveying a wavelength division multiplexed optical signal corresponding to a plurality of analog and/or digital optical signals.

BRIEF DESCRIPTION OF THE DRAWINGS

The invention will be better understood on reading the following description and on examining the accompanying figures. The figures are given solely by way of non-limiting indication of the invention. In the figures:

FIG. 1 is a diagram of an embodiment of a backbone interface of the invention;

FIG. 2a is a diagram of a three-port optical filter showing how it operates;

FIGS. 2b and 2c are spectral representations of two modes of operation of the FIG. 2a filter;

FIG. 3 is a diagram of the spectrum power density of the optical signal conveyed at the outlet of the backbone interface; and FIGS. 4a and 4b are diagrams respectively of an embodiment of a communications terminal interface of the invention, and of a variant thereof.

MORE DETAILED DESCRIPTION

Below, elements that perform identical functions are given the same references in the various figures.

FIG. 1 is a diagram of a backbone interface 1 of the invention. This interface 1 is interposed between a first group 2 of elements and a second group 3 of elements. The elements in these two groups 2 and 3 may be transmitters and/or receivers relative to the backbone interface 1 interposed between these two groups.

The first group 2 firstly comprises four transmitters: a first transmitter consists in a power supply device 4; a second transmitter device 5 constitutes a source of an analog signal corresponding to a first reference, e.g. a frequency reference (of the ultra-stable oscillator type for applications requiring highly accurate frequencies); a second source device 6 of a second analog signal (of the centralized master local oscillator (MLO) type); and a switch control device 7, which is described below. The four above-mentioned transmitter devices are referred to below respectively as the power supply, the first and second analog signal sources, and the switch controller.

The four transmitters thus have their respective outlets connected to corresponding inlets of the interface 1.

The first group 2 also comprises a digital central unit 8 which is a transmitter and a receiver. This unit 8 is specifically a TM/RC controller (e.g. an RTU). The controller 8 has one of its outlets connected to a corresponding inlet of the backbone interface 1 for transmitting remote control signals. It also has one of its inlets connected to an outlet of the backbone interface 1 to receive telemetry signals TM therefrom.

The inlet connected to the power supply 4 and receiving the power signal delivers said signal to a power light emitter 9. This emitter 9, e.g. based on laser diode technology, serves to convert the analog power signal received at its inlet into an optical power signal at a specified wavelength $\lambda p$. Similarly, the inlet connected to the first analog signal source 5 receives said analog signal and supplies it to the inlet of a second analog light emitter 10. The function of this emitter is to convert the analog signal at its inlet into an optical signal which is given a wavelength $\lambda A1$. This optical signal of wavelength $\lambda A1$ is amplified at the outlet from the emitter 10 by a conventional optical amplifier 11.

In contrast, the inlet connected to the second source 6 receives an optical signal directly. The second source 6 has an emitter 12 integrated therein converting an analog signal into an outlet optical signal. As a result, the signal output by the source 8 is an optical signal. This signal is amplified by an optical amplifier 14 of the interface.

The three optical signals at respective wavelengths $\lambda p$, $\lambda A1$, and $\lambda A2$ are then applied to respective inlets of a light switching assembly 13, referred to below as a light switch 13. This light switch is controlled by the switch controller 7.

The light switch 13 comprises three subswitches 131, 132, and 133. These light subswitches serve to switch the signals applied to their respective inlets to a selected one of their outlets. Specifically, each subswitch 131 and 133 has two outlet connections. The two outlet connections from the subswitch 131 are capable of conveying an optical signal of wavelength λA2, those of the subswitch 133 are capable of conveying an optical signal of wavelength λA1. However, the subswitch 132 has four outlet connections. These four outlet connections of the subswitch 132 are capable of conveying an optical signal of wavelength λp.

Naturally, the operation of a subswitch is such that one or more of its outlet connections convey its inlet signal.

The digital signal RC delivered by the TM/RC controller 8 and received by an inlet of the interface 1 is supplied to an inlet of a digital light emitter 15, e.g. a laser diode, whereas the digital signal TM comes from a digital light receiver 16, e.g. a photodiode that has received the TM optical signal on its inlet. These two components, the light emitter 15 and the light receiver 16 are connected, one via its outlet and the other via its inlet, to an optical multiplexer/demultiplexer 17 or "filter" having three ports. The principle on which such a filter 17 operates is shown in FIGS. 2a to 2c.

FIG. 2a shows how transmission can take place between the three connections connected to the three ports of the filter. Thus, transmission TAB is possible between ports A and B, and TAC between ports A and C, and transmission can take place in both directions. However no communication is possible between ports B and C.

FIGS. 2b and 2c relate to various configurations for the three-port filter. In FIG. 2b, the filter characteristic corresponds to that of a lowpass filter. On the connection TAB, the filter conserves short wavelengths up to λ1 and cuts off the remainder of the band. Thus, the connection TAC conveying the wavelength λ2 longer than λ1 is not transmitted.

In contrast, in FIG. 2c, the filter characteristics corresponds to a bandpass filter. Over the connection TAB, the filter conserves wavelengths around λ2 and cuts off the remaining side bands. As a result, the connection TAC including the wavelength λ3 is stopped.

The central port of the filter 17 receiving an optical connection conveying λN1 and λN2, corresponding respectively to the signals RC and TM, is connected to an inlet/outlet of an optical coupler 18, also referred to as a light distributor. This coupler 18 is connected with three couplers 191, 192, and 193 respectively. The first coupler 191 is also in connection with one of the outlet connections of the two switches 131 and 133. Similarly, the second coupler 192 is in connection with the other one of the outlet connections of the two switches 131 and 133.

The interface 1 has twelve inlets/outlets referenced 201 to 212 which are in the form of optical connectors, numbered downwards. Each of these inlets/outlets can correspond to an optical fiber for conveying an optical signal to a remote piece of equipment belonging to the group 3. In FIG. 1, five fibers 221 to 225 are shown respectively connected to an inlet and/or outlet of a respective piece of equipment 301 to 305 of the second group 3 of elements.

The connection between firstly the outlet of the switch 13 and the couplers 191 to 193, and secondly the inlets/outlets 201 to 212, are made as follows.

The distributor 191 and the switch 132 are combined via a multiplexer 310 leading to connector 201. A second outlet connection from the switch 132 and from the distributor 191 are combined by the second multiplexer 311 leading to the connector 202. The connectors 203 and 204 are directly connected to the coupler 191.

The connectors 205 to 208 are directly connected to the coupler 192.

The distributor 193 and the switch 132 are combined via a multiplexer 312 leading to the connector 209. A fourth outlet connection from the switch 132 is combined with an outlet from the distributor 191 via a multiplexer 312 leading to connector 210. The connectors 211 and 212 are directly connected to the coupler 191.

In the configuration of the system as described above, it is thus possible as shown in FIG. 1, to convey wavelengths λN1, λA1, λA2, and λp from the interface 1 towards the equipment 301 via the connector 201, while the wavelength λN2 is conveyed from that piece of equipment to the control module 8. This wavelength λN2 can be representative of TM information, but it is entirely possible to imagine any other type of information being sent in return from the equipment to the first group 2.

Similarly, the fiber 222 carries wavelengths λN1, λN2, λA1, and λA2, as does the fiber 223. Finally, the fiber 224 carries wavelengths λN1, λN2, λp, while the fiber 225 carries wavelengths λN1 and λN2.

It should be observed that one of the advantages which flows from the interface described with reference to FIG. 1 is the possibility provided by the invention of uniting all of the optical fibers within a common optical fiber harness and of selecting for each fiber in the harness a multiplex of wavelengths that can differ from one fiber to another. This "personalized" multiplex for each fiber is built up using the means offered by the interface 1 and by the commands issued by the equipment 7.

FIG. 3 shows one way of allocating signals supplied to the pieces of equipment, which may be considered as corresponding to allocating "services" to the pieces of equipment as a function of wavelength. Thus, in this particular implementation, it can be seen that the digital signals RC and TM, which have been allocated respective wavelengths λN1 and λN2 are arranged in spectral windows in the band [1200 nm; 1400 nm], where "nm" is wavelength in nanometers. The power signal allocated to wavelength λp is arranged in the band [1400 nm; 1500 nm] whereas the analog signals are allocated to wavelengths λA1, λA2, and λA3 that are all greater than 1500 nm. Naturally, this allocation is merely one possible implementation.

FIGS. 4a and 4b show an embodiment and a variant thereof for a terminal communications interface 32 disposed at the end of a fiber 221 to 225.

In FIG. 4a, the equipment 30 need only receive information RC and emit information TM towards the control module. For this purpose, an optical connector 33 of the equipment connects the end of the fiber 22 with an inlet/outlet of the terminal interface 32. This inlet/outlet is connected to a main port of a three-port multiplexer/demultiplexer or filter 34 (on the same principle as the filter 17). The other two group-splitting ports are connected respectively firstly to a digital light receiver 38 for receiving the digital signal RC associated with the wavelength λN1, and secondly to a digital light emitter 37 suitable for transmitting the digital signal TM on the wavelength λN2.

FIG. 4b shows a variant of the preceding figure for recovering the analog signal from the first source associated with the wavelength λA1. The connector 33 is connected to a first three-port filter 35 which delivers via one of its secondary group-splitting ports the wavelength λA1, and on the other such port the wavelengths λN1 and λN2. The path carrying λA1 is connected to the inlet of an analog light receiver 39 for recovering and subsequent processing of the analog signal from the first source. The second path is connected to a second three-port filter 36 (analogous to the filter 34) having one group-splitting port connected to the inlet of a digital light receiver 40 for recovering the signal RC. Its other group-splitting port is connected to a digital light emitter 41 suitable for transmitting the digital signal TM on the wavelength λN2.

Thus, it can be seen that the interface 32 can comprise a cascade of three-port filters, with the number of such filters being a function of the number of signals conveyed by the fiber 22.

Nevertheless, it is clear that the invention is not restricted to using three-port filters and that it is possible to devise any other equivalent means performing the multiplexing/demultiplexing function thereof.

The principle of using optical fibers to carry signals in wavelength multiplex, as described above, can be used for various different signals:
- a both-way serial digital data bus (e.g. OBDH);
- remote control (RC), signals in digital and serial form;
- telemetry or acquisition (TM), signals in digital and serial form;
- frequency references, microwave local oscillators (in range several hundreds of MHz to a few tens of GHz), ultra-stable oscillators (in the range a few MHz to a few hundred MHz), etc.;
- a phase reference, local oscillators (for an active antenna, for example);
- a time reference, a clock signal (several MHz to several hundred MHz), synchronization pulses, etc.; and
- power: power being carried in the form of light (power laser) to be supplied to: pieces of equipment that consume little power (remote sensors or actuators . . . ), pieces of equipment that require a continuous source of power (backup memory, standby command receiver, . . . ), switch-on circuits that require their own activation energy, etc.

The signals mentioned in the present application are naturally not limiting on the invention.

This set of signals can be conveyed in full over a single fiber or selectively depending on the needs of each piece of equipment. This selection is implemented on commands performed by the device 7 for controlling the switch. Such commands can be of any kind, programmed, manual, or remote.

It should also be observed that for reasons of system reliability, the pieces of equipment and/or the interfaces of the invention may be duplicated at least in part (redundancy) and/or may be provided with known means for selecting active members for making systems reliable.

As can be seen on reading the present description, the present invention provides numerous advantages, and in particular the following:
- a reduction in mass, the mass of the single optical fiber harness is lower than that of the sum of the various wire harnesses it replaces;
- a reduction in development and manufacturing costs since only one harness needs to be developed, manufactured, tested, and integrated;
- a reduction in the time taken to integrate a satellite since there are fewer points to be tested (cable and connectors) and fewer connections to be integrated per piece of equipment;
- elimination of problems of electromagnetic compatibility and verification tests, the optical fiber provides complete electromagnetic compatibility (insensitivity to radiated transmission, electrostatic discharges, . . . ) and it provides full electrical isolation; and
- standardization and interchangeability of equipment interfaces and of the harness.

What is claimed is:

1. A backbone communications interface between at least three members of a communications network for a space vehicle, the members comprising a first group of at least two members, and a second group of members, the backbone communications interface comprising:
   first electro-optical converter means for convening electrical signals which are received as inputs to the backbone communications interface from the first group into optical signals or for inverse conversion of a plurality of demultiplexed optical signals which are received from the second group into electrical signals that are transmitted to the first group; and
   first multiplexing/demultiplexing means for forming a plurality wavelength divided multiplexed optical signals from the optical signals which are converted, or for demultiplexing a multiplexed optical signal into a plurality of demultiplexed optical signals;
   said first multiplexing/demultiplexing means being connected to a plurality of optical fibers of said communications network, wherein the plurality of optical fibers convey the plurality of wavelength division multiplex signals to or from at least one member of the second group,
   the backbone communications interface further comprising selection means for selecting optical signals that are transmitted as the plurality of wavelength division multiplex signals, such that each of the plurality of optical fibers conveys a different group of optical signals,
   wherein the first group comprises:
   control means for delivering a remote control signal for controlling a remote piece of equipment, which is a member of the second group, or for receiving a telemetry signal from said piece of equipment;
   reference means for delivering at least one of a frequency reference signal, a phase reference signal, and a time reference signal to said remote piece of equipment; and
   means for delivering a power signal to said remote piece of equipment via an optical fiber among the plurality of optical fibers, wherein the remote piece of equipment is powered by the power signal that is delivered.

2. A backbone communications interface according to claim 1, wherein the selection means comprise at least one switching element which is controlled by a controller.

3. A backbone communications interface according to claim 1, wherein the interface includes a plurality of outlets which are each connected to an optical connection, and each of said plurality of outlets convey a respective selection of wavelengths which correspond to signals received or transmitted by the backbone communications interface.

4. A backbone communications interface according to claim 1, further comprising a communications terminal interface for a member of the second group, said communications terminal interface comprising:
   second multiplexing/demultiplexing means for selecting a wavelength from the plurality of wavelengths forming the wavelength division multiplex signals, which are received at an inlet of the communications terminal interface;
   second electro-optical converter means for converting said optical signal carried by said wavelength which is selected into an electrical signal which is supplied to said member of the second group or for performing an inverse conversion of an electrical signal which is provided by said member of the second group and carried by a determined wavelength.

5. A backbone communications interface according to claim 4, wherein the second multiplexing/demultiplexing means comprise first sub-multiplexing/demultiplexing means for selecting wavelengths among said plurality of wavelengths, and second sub-multiplexing/demultiplexing means for selecting one wavelength from the wavelength which are selected among said plurality of wavelengths.

6. A backbone communications interface according to claim 5, wherein the second multiplexing/demultiplexing means comprises a plurality of multiplexor/demultiplexors in a cascade configuration.

7. A backbone communications interface according to claim 4, wherein said electrical signal supplied to said member of the second group is a remote control signal or said electrical signal supplied by said member of the second group is a telemetry signal.

8. A backbone communications interface according to claim 1, wherein the plurality of optical fibers are provided as a harness.

9. A communications network between at least three members for a space vehicle including a first group of at least two members, and a second group of members, the network including a communications backbone interface comprising:
   first electro-optical converter means for converting electrical signals which are received as inputs to the backbone communications interface from the first group into optical signals or for inverse conversion of a plurality of demultiplexed optical signals which are received from the second group into electrical signals that are transmitted to the first group; and
   first multiplexing/demultiplexing means for forming a plurality wavelength divided multiplexed optical signals from the optical signals which are converted, or for demultiplexing a multiplexed optical signal into a plurality of demultiplexed optical signals;
   said first multiplexing/demultiplexing means being connected a plurality of optical fibers of said communications network, wherein the plurality of optical fibers convey the plurality of wavelength division multiplex signals to or from at least one member of the second group,
   the backbone communications interface further comprising selection means for selecting optical signals that are transmitted as the plurality of wavelength division multiplex signals, such that each of the plurality of optical fibers conveys a different group of optical signals,
   wherein the first group comprises:
   control means for delivering a remote control signal for controlling a remote piece of equipment, which is a member of the second group, or for receiving a telemetry signal from said piece of equipment;
   reference means for delivering at least one of a frequency reference signal, a phase reference signal, and a time reference signal to said remote piece of equipment; and
   means for delivering a power signal to said remote piece of equipment via an optical fiber among the plurality of optical fibers, wherein the remote piece of equipment is powered by the power signal that is delivered.

10. A communications network between at least three members for a space vehicle, the communications network comprising:
   a backbone communications interface between said at least three members, the members comprising a first group of at least two members, and a second group of members, the backbone communications interface comprising:
   first electro-optical converter means for converting electrical signals which are received as inputs to the backbone communications interface from the first group into optical signals or for inverse conversion of a plurality of demultiplexed optical signals which are received from the second group into electrical signals that are transmitted to the first group; and
   first multiplexing/demultiplexing means for forming a plurality wavelength divided multiplexed optical signals from the optical signals which are converted, or for demultiplexing a multiplexed optical signal into a plurality of demultiplexed optical signals;
   said first multiplexing/demultiplexing means being connected a plurality of optical fibers of said communications network, wherein the plurality of optical fibers convey the plurality of wavelength division multiplex signals to or from at least one member of the second group,
   the backbone communications interface further comprising selection means for selecting optical signals that are transmitted as the plurality of wavelength division multiplex signals, such that each of the plurality of optical fibers conveys a different group of optical signals, and
   a communications terminal interface for a member of the second group, said communications terminal interface comprising:
   second multiplexing/demultiplexing means for selecting a wavelength from the plurality of wavelengths forming the wavelength division multiplex signals, which are received at an inlet of the communications terminal interface;
   second electro-optical converter means for converting said optical signal carried by said wavelength which is selected into an electrical signal which is supplied to said member of the second group or for performing an inverse conversion of an electrical signal which is provided by said member of the second group and carried by a determined wavelength,
   wherein the first group comprises:
   control means for delivering a remote control signal for controlling a remote piece of equipment, which is a member of the second group, or for receiving a telemetry signal from said piece of equipment;
   reference means for delivering at least one of a frequency reference signal, a phase reference signal, and a time reference signal to said remote piece of equipment; and
   means for delivering a power signal to said remote piece of equipment via an optical fiber among the plurality of optical fibers, wherein the remote piece of equipment is powered by the power signal that is delivered.

* * * * *